United States Patent
Angelo et al.

(10) Patent No.: US 12,074,981 B2
(45) Date of Patent: Aug. 27, 2024

(54) BLOCKCHAIN CONSOLIDATION WITH ACTIVE ARCHIVING

(71) Applicant: MICRO FOCUS LLC, Santa Clara, CA (US)

(72) Inventors: Michael F. Angelo, Houston, TX (US); Douglas Max Grover, Rigby, ID (US)

(73) Assignee: Micro Focus LLC, Santa Clara, CA (US)

( * ) Notice: Subject to any disclaimer, the term of this patent is extended or adjusted under 35 U.S.C. 154(b) by 235 days.

(21) Appl. No.: 17/762,609

(22) PCT Filed: May 19, 2021

(86) PCT No.: PCT/US2021/033207
§ 371 (c)(1),
(2) Date: Mar. 22, 2022

(87) PCT Pub. No.: WO2022/245351
PCT Pub. Date: Nov. 24, 2022

(65) Prior Publication Data
US 2023/0275763 A1    Aug. 31, 2023

(51) Int. Cl.
*H04L 9/32* (2006.01)
*H04L 9/00* (2022.01)

(52) U.S. Cl.
CPC .............. *H04L 9/3239* (2013.01); *H04L 9/50* (2022.05)

(58) Field of Classification Search
CPC ................................ H04L 9/3239; H04L 9/50
See application file for complete search history.

(56) References Cited

U.S. PATENT DOCUMENTS

| | | | |
|---|---|---|---|
| 10,445,032 B2 | 10/2019 | Saito | |
| 10,459,946 B2 | 10/2019 | Madisetti et al. | |
| 10,805,067 B1 | 10/2020 | Griffin | |
| 10,860,259 B1 | 12/2020 | Winarski | |
| 11,113,241 B1 * | 9/2021 | Winarski | G06F 16/188 |
| 2018/0205552 A1 | 7/2018 | Struttmann | |

(Continued)

FOREIGN PATENT DOCUMENTS

| CN | 109543455 B | 7/2021 |
|---|---|---|
| WO | WO-2019242059 A1 | 12/2019 |

(Continued)

OTHER PUBLICATIONS

Robert Norvill et al; IPFS for Reduction of Chain Size in Ethereum: Cybermatics; Jul. 2018; 9 pages.

(Continued)

*Primary Examiner* — Viet D Vu
(74) *Attorney, Agent, or Firm* — Sheridan Ross P.C.

(57) ABSTRACT

An event is identified. For example, the event is that the an original blockchain has reached a threshold number of blocks. In response to identifying the event: the original blockchain is completed and a second blockchain is created. The second blockchain comprises a first consolidation genesis block. The first consolidation genesis block comprises a complete hash of the original blockchain and a first consolidation pointer that points to the original blockchain. This allows the blockchain to be divided into smaller pieces that can be verified using less processing resources. In addition, this allows for more efficient searching of blockchains.

20 Claims, 8 Drawing Sheets

(56) References Cited

U.S. PATENT DOCUMENTS

| | | | |
|---|---|---|---|
| 2018/0323963 A1* | 11/2018 | Stollman | ............... H04L 9/3239 |
| 2019/0146946 A1 | 5/2019 | Zhang | |
| 2019/0190697 A1 | 6/2019 | Cunico | |
| 2019/0349733 A1 | 11/2019 | Nolan | |
| 2020/0034311 A1 | 1/2020 | Wang | |
| 2020/0076576 A1* | 3/2020 | Ahlbäck | ............... H04L 9/0637 |
| 2020/0125269 A1 | 4/2020 | Karame | |
| 2020/0125661 A1 | 4/2020 | Albright | |
| 2020/0204344 A1 | 6/2020 | Sardesai | |
| 2020/0204349 A1 | 6/2020 | Sardesai | |

FOREIGN PATENT DOCUMENTS

| | | |
|---|---|---|
| WO | WO-2020108742 A1 | 6/2020 |
| WO | WO-2021003985 A1 | 1/2021 |

OTHER PUBLICATIONS

Wikipedia; Bitcoin scalability problem; Jan. 18, 2022; 6 pages https://en.wikipedia.org/wiki/Fork_(blockchain).

Wikipedia; Fork (blockchain);https://en.wikipedia.org/wiki/Fork_(blockchain); Oct. 11, 2019; 5 Pages.

International Search Report / Written Opinion; PCT/US2021/033207; Mailed Feb. 15, 2022; 11 pages.

\* cited by examiner

BLOCKCHAIN CONSOLIDATION WITH ACTIVE ARCHIVING

FIELD

The disclosure relates generally to blockchains and particularly to consolidation of blockchains.

BACKGROUND

Blockchain technology is becoming pervasive in the industry and is being used in many environments. One major problem that is happening is that blockchains can become incredibly long. For example, blockchains are being used to track currency exchanges, security information, Internet of Things (IoT) devices, database transactions, etc. Over time, many of these types of blockchains can have millions or even billions of blocks stored on a number of nodes in a distributed ledger. Verification of long blockchains in a distributed ledger can be become very processor intensive. For example, the article "The Cost of Bitcoin Mining Has Never Really increased," by Y-Der Song and Tomase Aste, October 2020, states, when discussing Bitcoin transactions that "the miners in the Bitcoin network are presently (May 2020) computing nearly $10^{25}$ hashes per day, up over 10 orders of magnitude from the 2010 levels. We estimate in this paper that this hashing activity currently corresponds to an energy cost of around 1 million USD per day and around a billion USD over the past year. In turn, this corresponds a per transaction costs as high as 13 USD in January 2020." This is clearly a major problem with blockchain that does not currently have a good solution.

In addition, for traditional blockchains, the blockchain structure is monolithic and cannot be altered. If the transaction data is archived, the transaction data has to be uncompressed to verify that the transaction data matches the hash. This can result in slow verification of the forward hash when a new block is added to the blockchain.

SUMMARY

These and other needs are addressed by the various embodiments and configurations of the present disclosure. An event is identified. For example, the event is that the an original blockchain has reached a threshold number of blocks. In response to identifying the event: the original blockchain is completed and a second blockchain is created. The second blockchain comprises a first consolidation genesis block. The first consolidation genesis block comprises a complete hash of the original blockchain and a first consolidation pointer that points back to the original blockchain. This allows the blockchain to be divided into smaller pieces that can be verified using less processing resources. In addition, this allows for more efficient searching of blockchains.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A. B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein, it is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any, combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The terms "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all equivalents thereof. Further, the structures, materials or acts and the equivalents thereof shall include all those described in the summary, brief descriptions of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficult) level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

As described herein, a "genesis block" is the first block that is created for an original blockchain. For each original blockchain, there is only one genesis block.

A "consolidation genesis block" is new type of genesis block that links to a previous blockchain in a consolidated blockchain. The consolidation genesis block comprises a complete hash of the previous blockchain. The complete hash is used to validate the integrity of the of the previous blockchain.

The term "consolidated blockchain" refers to a series two or more of blockchains (including the original blockchain) that have been split up into separate blockchains by using consolidation genesis blocks that link the blockchains together. The consolidated blockchain has one genesis block for the original blockchain and a respective consolidation genesis block for the other blockchains in the consolidated blockchain.

The term "transaction," refers the data stored in blocks of a blockchain. For example, a transaction may be purchasing an item, a login event, an administration event, a network event, an anomaly event, and/or the like. A transaction data is basically any information associated with an event that is captured in a blockchain.

As described herein, a "complete hash" is a hash of all the hashes of all the blocks in a blockchain. A complete hash may refer to both a completed blockchain or an active blockchain. A complete hash may be a forward hash or a reverse hash.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
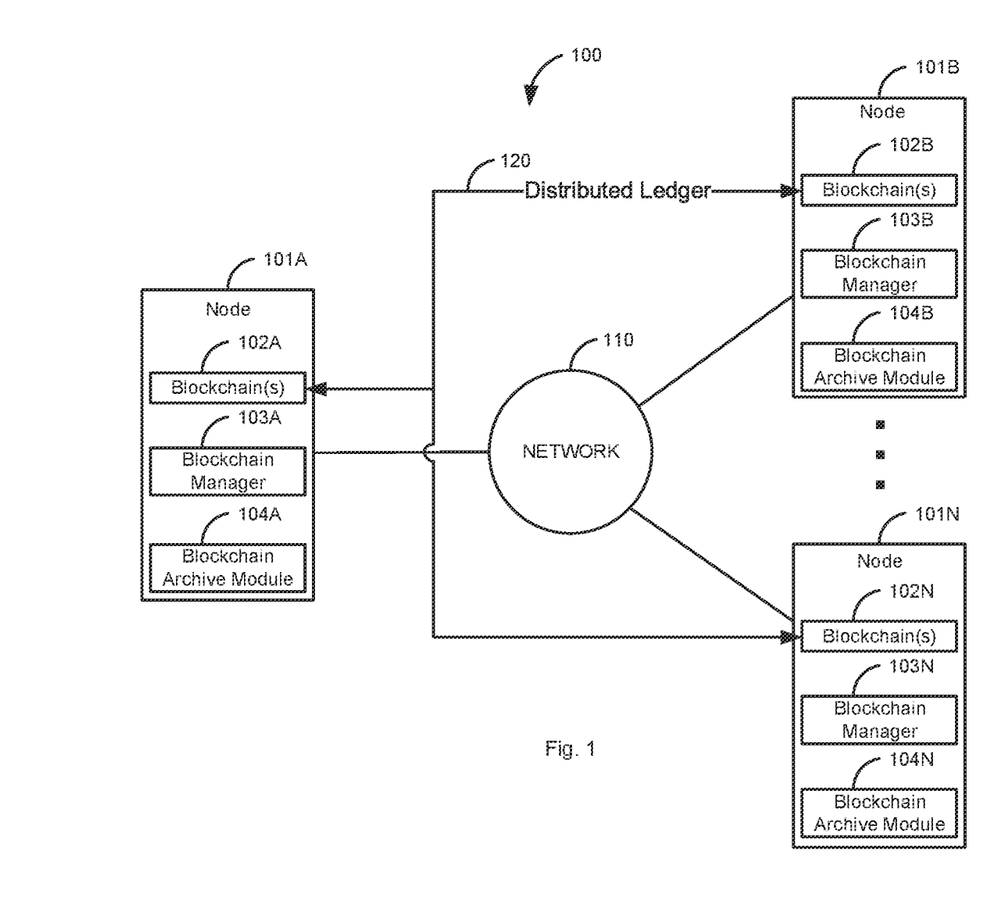
FIG. 1 is a block diagram of a first illustrative system that shows a blockchain in a distributed ledger.

FIG. 1 is a block diagram of a first illustrative system 100 that shows a blockchain 102 in a distributed ledger 120. The first illustrative system 100 comprises nodes 101A-101N and a network 110.

The nodes 101A-101N can be or may include any hardware/software that can support the use of blockchains 102 in the distributed ledger 120, such as, a Personal Computer (PC), a server, a trust authority server, a gateway, a router, a network device, and/or the like. As shown in FIG. 1, any number of nodes 101A-101N may be connected to the network 110. The nodes 101A-101N further comprise blockchains 102A-102N, blockchain managers 103A-103N, and blockchain archive modules 104A-104N.

The blockchains 102A-102N are copies of the same blockchain 102 that comprise the distributed ledger 120. The size of the blockchains 102A-102N may vary based on implementation. The blockchains 102A-102N are a form of a replicated distributed database.

The blockchain managers 103A-103N can be or may include any hardware coupled with software that can manage the blockchains 102A-102N. The blockchain managers 103A-103N work together to determine how to manage the blockchains 102A-102N. For example, the blockchain managers 103A-103N may vote to validate a new block being added to the blockchains 102A-102N in the distributed ledger 120.

The blockchain archive modules 104A-104N can be or may include any hardware/software that can backup/archive individual blockchains 102 on the respective node 101. The blockchain archive modules 104A-104N may work in conjunction with each other based on an archive policy of the distributed ledger 120. In another embodiment, each individual blockchain archive module 104A-104N may have different archive rules and act independently of the other blockchain archive modules 104.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

Figure 2:
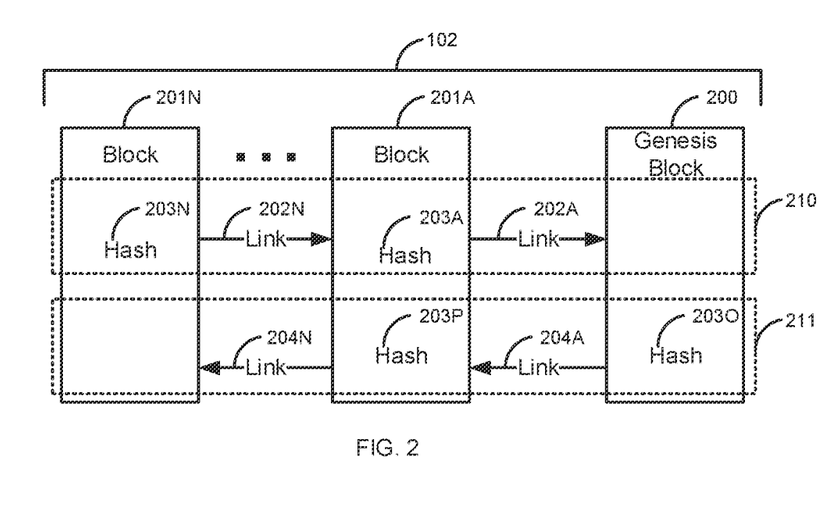
FIG. 2 is a diagram of a blockchain.

FIG. 2 is a diagram of a blockchain 102. Illustratively, the nodes 101A-101N, the blockchain managers 103A-103N, and the blockchain archive modules 104A-104N are stored-program-controlled entities, such as a computer or microprocessor, which performs the method of FIGS. 2-8 and the processes described herein by executing program instructions stored in a computer readable storage medium, such as a memory a computer memory, a hard disk, and/or the like). Although the methods described in FIGS. 2-8 are shown in a specific order or structure, one of skill in the art would recognize that the steps/structures in FIGS. 2-8 may be implemented in different orders/structures and/or be implemented in a multi-threaded environment. Moreover, various steps may be omitted or added based on implementation.

The blockchain 102 of FIG. 2 comprises a genesis block 200, block 201A, and block 201N. The designation "N" for block 201N indicates that there may be any number of blocks 201 in between blocks 201A and 201N, including zero blocks 201. The description generally assumes that there are not any blocks 201 between blocks 201A and 201N. In the blockchain 102 of FIG. 2, block 201N has a forward link 202N back to block 201A. Likewise, block 201A has a forward link 202A back to the genesis block 200. The hash 203N is a hash of the block 201A. Likewise, the hash 203A is a hash of the genesis block 200. The forward links 202A-202N and the hashes 203A and 203N of the blockchain 102 comprise a complete forward hash 210 of the blockchain 102 (a sum of all the hashes 203A-203N). Traditional blockchains 102 like Bitcoin™ use a complete forward hash 210 similar to what is described in FIG. 2.

The blockchain 102 may also comprise a complete reverse hash 211. The complete reverse hash 211 comprises reverse links 204A-204N and hashes 203O-203P. The hash 203O is a hash of block 201A and the hash 203P is a hash of the block 201N. The reverse hash 211 is used to detect hash collisions that may occur in the forward hash 210. A hash collision is where to different sets of data produce the same hash. Thus, if a hacker has altered the data in the block 201A with new data that results in a hash collision of the hash 203N, the change can be detected by the complete reverse hash 211. The complete reverse hash 211 further ensures the integrity of the blockchain 102. However, the use of the complete reverse hash also has a cost of additional processing to ensure the integrity of the blockchain 102.

The hash 203 may be generated using known hashing algorithms, such Securing Hashing Algorithm (e.g. SHA 256), Message Digest Algorithm (e.g., MD 5), and/or the like. In one embodiment, instead of using a complete reverse hash 211, a second complete forward hash 210 may be used where two different hashing algorithms (e.g., SHA 256 and MD 5) may be used to detect hash collisions.

Figure 3:
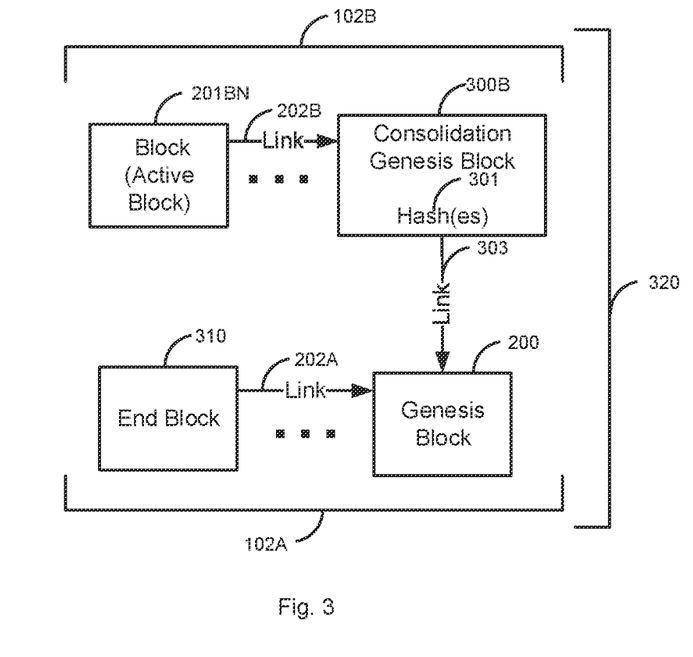
FIG. 3 is a diagram of an exemplary structure of a consolidated blockchain that is divided into two blockchains using a consolidation genesis block.

FIG. 3 is a diagram of an exemplary structure of a consolidated blockchain 320 that is divided into two blockchains 102A-102B using a consolidation genesis block 300B. FIG. 3 comprises blockchains 102A and 102B. The blockchains 102A and 102B comprise the consolidated blockchain 320. The blockchain 102A comprises a genesis block 200 and an end block 310. The blockchain 102A is what is called an original blockchain 102A (i.e., the first blockchain). The original blockchain 102A is the blockchain 102A that contains the genesis block 200.

When it is determined that the blockchain 102A is to be consolidated, the last block in the original blockchain 102A may be identified as an end or last block 310 so that additional blocks 201 cannot be added to the blockchain 102A later on. This may be accomplished by setting a field (a new field) that is part of the hashed data of a transaction block 201 that indicates that the block 201 is an end block 310. The end block 310, in this example, is a block 201 that also includes transaction data. The end block 310, based on the field, signifies that no more blocks 201 can be added to the original blockchain 102A, Other blocks 201 that were previously added and are based on transactions may also have the end block field; however, for these blocks 201 the end block field indicates that it is not an end block 310.

Alternatively, the end block 310 may not have any transaction data when it is added to the end of the original blockchain 102A. This type of end block 310 may be more appropriate to use when any of the events that starts the consolidation process are not related to a transaction (e.g., based on a timer). In this embodiment, the end block 310 has a type field to signify that it is different from other blocks 201. For example, the blocks 201 (transaction blocks) and the genesis block 200 would have a different type identifiers that indicates the respective type. The end block 310 is added in the same manner as other blocks 201.

In another embodiment, the last block in the blockchain 102A is not an end block 310. In this embodiment, the hashes 301 (discussed later) will still validate the blockchain 102A.

When it is determined that the blockchain 102A is to be consolidated (e.g., when the original blockchain 102A reaches a threshold length (e.g., 100,000 blocks long)), a new blockchain 102B is created with a new type of genesis block 200 called a consolidation genesis block 300B, The consolidation genesis block 300B is different from the genesis block 200 (what is currently used in the prior art) in that it has a consolidation pointer 303 that points to the original blockchain 102A. The consolidation genesis block 300B may be identified by a new field that identifies it as a consolidation genesis block 300B (or by the consolidation pointer itself).

In addition, the consolidation genesis block 300B includes one or more complete hashes 301. The one or more complete hashes 301 may include a complete forward hash of the blockchain 102A (i.e., all the blocks 200/201/310 in the blockchain 102A), a complete reverse hash of the blockchain 102A, and/or a complete second forward/reverse hash of the blockchain 102A. An advantage to having a complete forward hash in the consolidation genesis block 300B versus only having a hash of the last block (e.g., end block 310) is that the rest of the blockchain 102A may be changed and not detected by the hash 301.

The consolidation pointer 303 to the original blockchain 102A in the consolidation genesis block 300B is included as part of a hash of the consolidation genesis block 300B. Thus, the consolidation pointer/complete hash cannot be changed without detection. The blockchain 102B with the consolidation genesis block 300B (the current active blockchain 102B) can now add new blocks (e.g., block 201BN) as is normally done in a distributed ledger 120. This way, the blockchain manager 103 only has to run the hash check over the latest blockchain (102B) instead of the full blockchain (which would have been a single blockchain 102 that contains all blocks 201 (minus the consolidation genesis block 300B) of the consolidated blockchain 320). If verification of the consolidated blockchain 320 needs to be completed, the verification of the consolidated blockchain 320 can be done periodically or based on an event by verifying the complete forward hash 210 of the blockchain 102B and the complete forward hash 210 of the original blockchain 102A. Thus, the integrity of the consolidated blockchain 320 is maintained.

Creating the new blockchain 102B may be validated by the nodes 101 in the distributed ledger 120 based on verification of a digital certificate or encryption key presented by the node 101 proposing the new blockchain 102B. If a majority of the nodes 101 in the distributed ledger 120 concur, the new blockchain 102B with the consolidation genesis block 300B is created. For example, if the nodes 101A-101N in the distributed ledger 120 determine that the digital certificate is valid and that the original blockchain 102A has reached 100,000 blocks (an administered feature), the nodes 101A-101N in the distributed ledger 120 will vote to create the new blockchain 102B.

Figure 4:
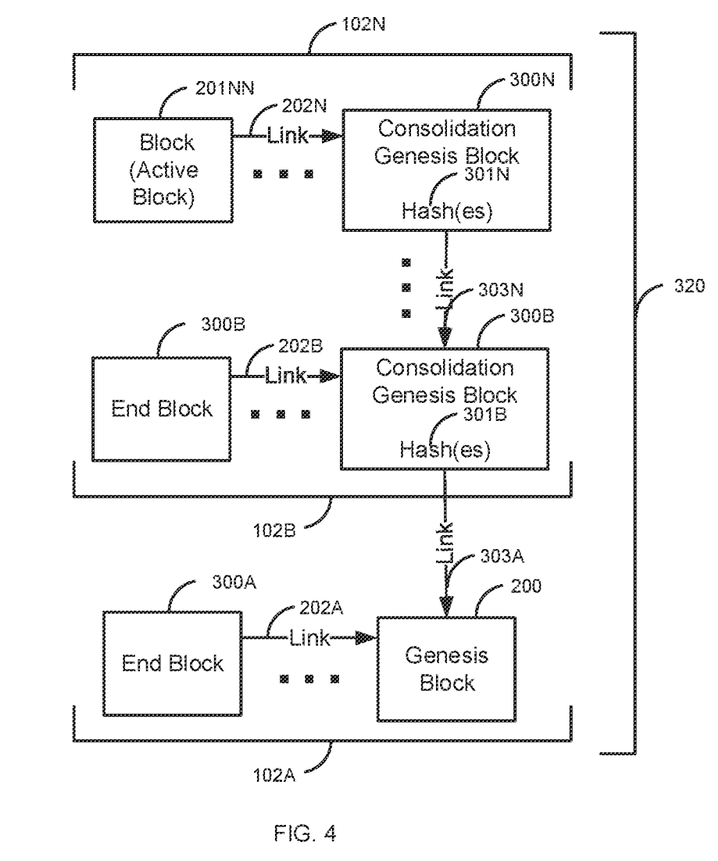
FIG. 4 is a diagram of an exemplary structure of a consolidated blockchain that is divided into multiple blockchains using multiple consolidation genesis blocks.

FIG. 4 is a diagram of an exemplary structure of a consolidated blockchain 320 that is divided into multiple blockchains 102A-102N using multiple consolidation genesis blocks 300B-300N. Using the above example of FIG. 3, if the blockchain 102B reaches 100,000 blocks, the process repeats as shown in in FIG. 4 wherein the blockchain 102N is created and added to the consolidated blockchain 320. The blockchain 102N includes a consolidation genesis block 300N with a consolidation pointer 303N to the blockchain 102B. Likewise, the consolidation genesis block 300N includes one or more complete hashes 301N like described in FIG. 3.

In FIG. 4, what basically occurs is a linked list of blockchains 102B-102N that eventually point back to the original blockchain 102A to form the consolidated blockchain 320. By only having to validate to the latest blockchain 102, the amount of processing required to validate the hashes 203 is dramatically reduced versus traditional methods. As discussed in FIG. 3, the consolidated blockchain 320 may be validated by verifying the hash of the current blockchain 102N, the hash of the blockchain 102B, and the hash of the blockchain 102A In one embodiment, the consolidation pointer 303N/hash 301N in the consolidation genesis block 300N may include more than just a consolidation pointer 303N/hash 301N of the previous blockchain 102B. Instead, consolidation genesis block 300N may also include the consolidation pointer 303A to the blockchain 102A and the hash 301B for all/any previous blockchains 102A-102B. In addition, the consolidation genesis block 300N may include additional information (e.g., search information) about any previous blockchains 102A-102B. For example, the consolidation genesis block 300N may include time information (start and end time of each of the previous blockchains 102A-102B), a summary of blocks 201 in the previous blockchains 102A-102B, a number of blocks 201 in each of the previous blockchains 102A-102B, and/or the like. This information can be used to quickly identify a specific blockchain 102A/102B, in a search. For example, if someone wanted to search for a transaction 102 that occurred within a specific timeframe, the information in the consolidation genesis block 300N allows for a simple lookup to identify and link to the appropriate previous blockchain 102A/102B.

Another advantage with consolidated blockchains 320 is that if you want to verify a transaction that occurred somewhere in the consolidated blockchain 320, the process does not have to hash the full blockchain 102 to verify an individual transaction. For example; assume that the process of FIG. 4 is used where the blockchain 102 is consolidated on the last day of every month starting in January 2020 (the original blockchain 102A is for January 2020) up until the end of January 2021. If someone wanted to validate a transaction that occurred in November 2020, the user can run an audit of the November 2020 blockchain 102 to validate the November transaction. This dramatically reduce the amount of power to process the of hashes by over 90% compared to where a single blockchain 102 is used.

Figure 5:
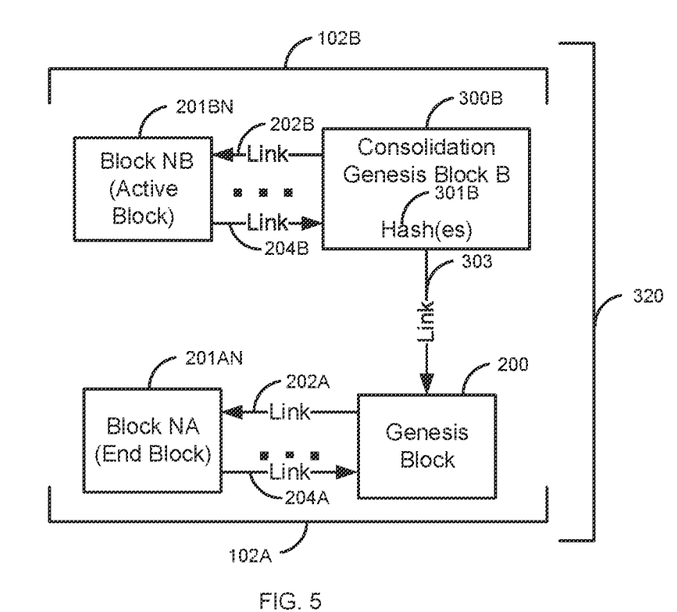
FIG. 5 is a diagram of an exemplary structure of a consolidated blockchain that is divided into two blockchains where the blockchains contain both a forward hash and a reverse hash.

FIG. 5 is a diagram of an exemplary structure of a consolidated blockchain 320 that is divided into two blockchains 102 where the blockchains 102A-102B contain both a complete forward hash 210 and a complete reverse hash 211. In FIG. 5, the consolidation genesis block 300B may have a complete forward hash 301B of the original blockchain 102A, a complete reverse hash 301B of the original blockchain 102A, a second complete forward hash 301B of the original blockchain 102A, and/or a second complete reverse hash 301B of the original blockchain 102A. The consolidation pointer 303 works in a similar manner as described above in FIGS. 3-4.

The above processes are described where the new blockchain 102B (also 102N) with the consolidation genesis block 300 is created based on a defined number of blocks 201 or time period. However, the creation of the new blockchain 102B (also 102N) with the consolidation genesis block 300 may occur based on other events, such as, an amount of transaction data in the previous blockchain (e.g., 102A), a security event, an administrated value, a type of transaction, a combination of these, and/or the like. Thus, different blockchains 102 may have different lengths and be created based on different individual events in the consolidated blockchain 320.

One key advantage to the use of the consolidation genesis blocks 300 is that they can work with existing blockchains 102 without modification of the existing blockchains 102 (i.e., the consolidation genesis blocks 300 are forward compatible). For example, the consolidation genesis block 300 may be used with Bitcoin™.

The above processes allow for verification of a longer blockchains 102 based on the transactions within an individual blockchain 102 of the consolidated blockchain 320. This process can be further enhanced to determine validity of blocks 201 within an individual blockchain 102 by using short check hashes 601 as shown in FIG. 6.

Figure 6:
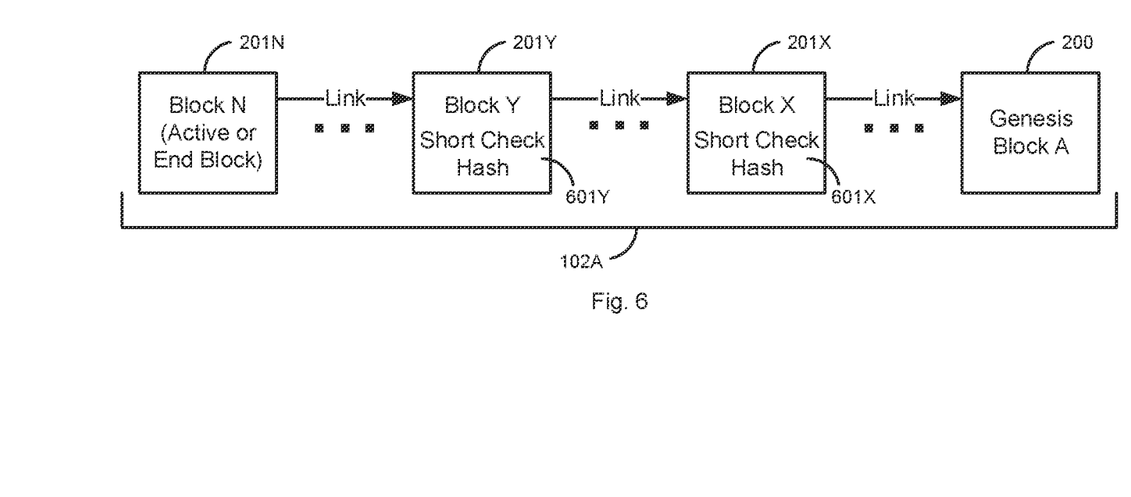
FIG. 6 is diagram of a blockchain that uses short check hashes.

FIG. 6 is diagram of a blockchain 102A that uses short check hashes 601. While FIG. 6 is shown for the original blockchain 102A, the process of FIG. 6 can be used for any of the blockchains 102A-102N described herein, in addition, the process of FIG. 6 can be used with traditional blockchains 102 (for new blocks 201 that are added).

The blockchain 102A of FIG. 6 comprises the genesis block 200, block 201X, block 201Y, and block 201N. The genesis block 200 is a traditional genesis block 200. The blocks 201X and 201Y are typically traditional transaction blocks 201 that contain short check hashes 601X and 601Y. The short check hashes 601X and 601Y may be inserted into the blockchain 102A based on an event, such as, based on a number of blocks 201, a time period, an amount of transaction data, a type of transaction data, and/or the like. The short check hash 601 is a hash of all the blocks 201 up to a block 201 that contains previous short check hash 601 or the genesis block 200/consolidation genesis block 300. For example, the short check hash 601X is a hash over all the blocks 201 from block 201X to the genesis block 200 (similar to the complete forward hash described in FIG. 2, but for a number of blocks 201). Likewise, the short check hash 601Y is a hash over all the blocks 201 from block 201Y to block 201X. This allows for even more fine grained verification of segments of a blockchain 102A and individual blocks 201 within the segments. The use of short check hashes 601 can also be used as a second check for the blockchain 102A to detect hash collisions if only a forward hash is used in the blockchain 102A. The number of blocks 201 between short check hashes 601 may be fixed or variable depending upon implementation.

The short check hashes 601 may be based on a reverse hash or a second type of forward hash verses the hashing in the blockchain 102A. For example, the short check hashes 601 may be reverse hashes while the blockchain 102A uses a complete forward hash 210 (or there may be both reverse/forward short check hashes 601 in the same blocks 201). In this case, the short check hash 601X would cover a reverse hash from the genesis block 200 to the block 201X. The short check hash 601 may also include the number of blocks 201 covered by the shod check hash 601.

In another embodiment the short check hash 601 may not point back to the previous short check hash 601 or genesis block 200/consolidation genesis block 300. Instead the short check hash 601 (an independent short check hash 601) includes a number of blocks parameter. The number of blocks parameter is used to determine where to stop calculating the hash value for the independent short check hash 601. The number of blocks parameter can change based on implementation or need. The independent short check hash 601 allows for the detection of hash collisions in a specific portion of a blockchain 102. For example, if a user wanted make a portion of the blockchain 102A more secure based on a specific transaction type, an independent short check hash 601 can be added to the blockchain 102 to secure a portion of the blockchain 102 from hash collisions. Thus, less processing is required versus having to do a full reverse or second hash of the entire blockchain 102.

By dividing up a long blockchain 102 into a series of blockchains 102 and by using the short check hashes 601/independent short check hashes 601, validation of individual blocks 201 in a blockchain 102 can be done much more efficiently by only having to validate a small portion of the blockchain 102.

The above process can be used to enhance searching for blockchain transactions with validation. Once a transaction is found, the transaction can be validated based on a short check hash 601/independent short check hash 601/individual blockchains 102 of a consolidated blockchain 320 that contains the transaction instead of running a hash over the entire consolidated blockchain 320.

Figure 7:
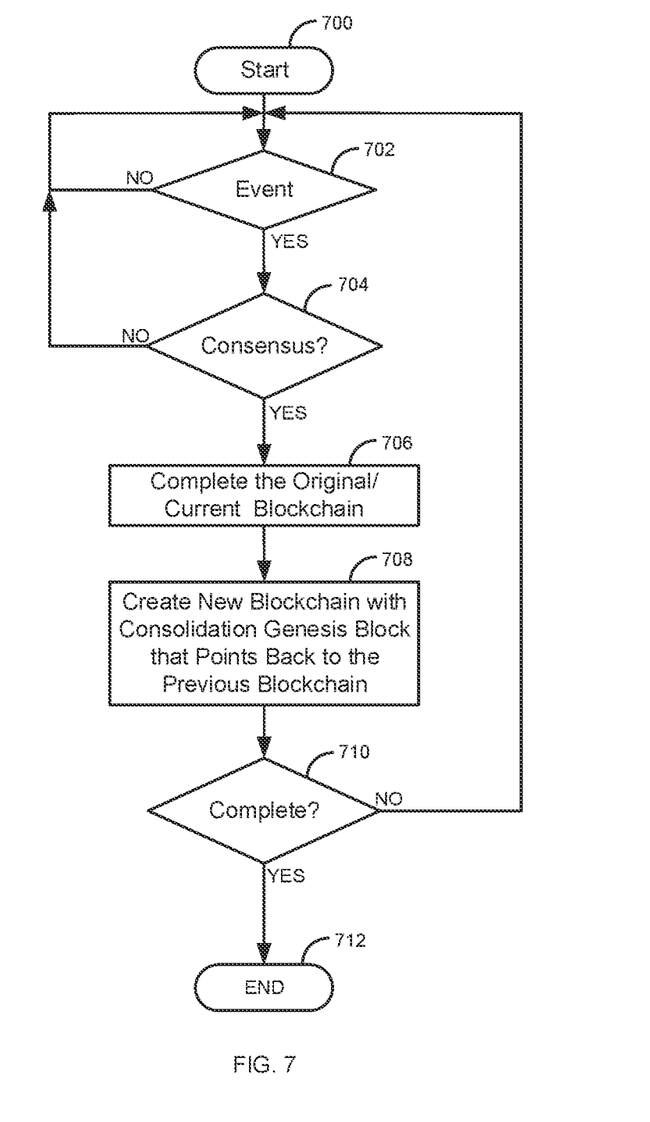
FIG. 7 is a flow diagram of a process for blockchain consolidation.

FIG. 7 is a flow diagram of a process for blockchain 102 consolidation. The process starts in step 700. The process waits for a consolidation event in step 702. A consolidation event may be where the active blockchain 102 has reached a threshold number of blocks 201 or any defined event as discussed herein. If a consolidation event has not occurred in step 702, the process of step 702 repeats.

Otherwise, if there is a consolidation event in step 702, the process determines if there is a consensus vote from the nodes 101 in the distributed ledger 120. A consensus vote requires more than 50% of the nodes 101 in the distributed ledger 120 to agree that a new blockchain (e.g., blockchain 102B) will be created. If there is not a consensus in step 704, the process goes back to step 702.

If there is a consensus in step 704, the original 102A (or the current blockchain 102) are completed in step 706. For example, an end block 310 is added to the end of the current blockchain 102 and the complete hash(es) 301 are generated. Alternatively, completion may mean just generating the hashes 301 without adding an end block 310 to the blockchain 102A. A new blockchain 102B (which is now the current active blockchain 102) is created with a consolidation genesis block 300 that includes a consolidation pointer 303 that points back to the original/previous blockchain 102A in step 708. In addition, in step 708, the consolidation genesis block has a complete hash of the previous blockchain 102.

The process determines, in step 710, if the process is complete. If the process is complete in step 710, the process ends in step 712. Otherwise, the process goes back to step 702.

Figure 8:
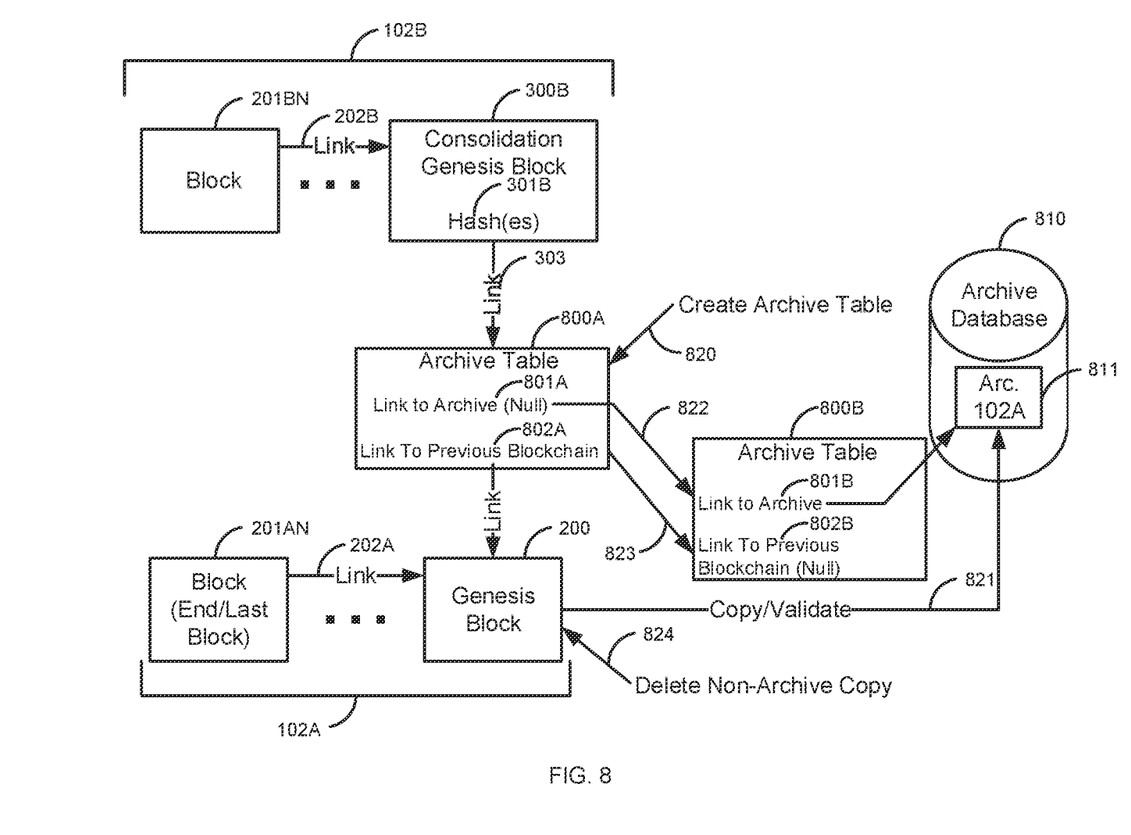
FIG. 8 is a diagram of a process for active archiving of a consolidated blockchain.

FIG. 8 is a diagram of a process for active archiving of a consolidated blockchain 320. The process of FIG. 8 is based on the creation of the blockchain 102B as described in FIG. 3. When archiving is active, an archive table 800 is created to allow dynamic archiving of blockchains 102 in a consolidated blockchain 320. FIG. 8 comprises the blockchains 102A-102B, archive tables 800A-800B, an archive database 810, and an archive 811 of the blockchain 102A.

The archive tables 800A-800B are used to show a state of an archive table 800 as it progresses through the archive process. The state of the archive tables 800A-800B is not limited to what is described in FIG. 8, but may vary based on implementation.

The archive database 810 further comprises an archive copy 811 of the blockchain 102A, Although not shown, the archive database 810 may include additional archive copies (e.g., for blockchain 102B like described in FIG. 4) if other blockchains 102 are archived.

As part of step 708 where the new blockchain 102 is created, the archive table 800A is created in step 820. When the consolidation table 800A is created in step 820, the consolidation genesis block 300B, instead of linking directly to the previous blockchain 102A, links instead to the archive table 800A. When the archive table 800A is created in step 820, the archive table contains 800A two links: 1) a link to an archive of the blockchain 801A (e.g., long term lower cost/compressed storage), and 2) a link to the previous blockchain 802A (blockchain 102A in this example). In one embodiment, when the archive table 800A is created based on the creation of the consolidation genesis block 300B, the link to the archive blockchain 801A is invalid (e.g., a null pointer or a known value to indicate that the link is invalid). In the example in FIG. 8, only the link to the previous blockchain 802A in the archive table 800A is valid.

If the archive process decides that the individual blockchain 102 is to be archived (e.g., an administrator or rule decide to make an archive), the blockchain archive module 104, in step 821, copies the blockchain 102 that is being archived 811 (blockchain 102A in FIG. 8) to the archive database 810. The copying may include compressing the data of the previous blockchain 102A. The copying of step 811 may also include verification of the complete hash (i.e., forward hash 210) in the archive database 810 (e.g., by uncompressing the data and comparing the hash of the archive blockchain 811 to a complete hash of the blockchain 102A or the hash 301B). The blockchain archive module 104, in step 822, sets link to the archive blockchain 801A to point to the archived copy of the blockchain 811 stored in the archive database 810 as shown in the archive table 800B. The blockchain archive module 104, in step 823, sets the link to the previous blockchain 802A (blockchain 102A in this example) to indicate that it is invalid (e.g., null) as shown in archive table 800B. The blockchain archive module 104, in step 824, then deletes the previous blockchain (blockchain 102A in this example).

If the blockchain archive module 104 wants to immediately archive the previous blockchain 102A when a new blockchain 102B is created, the blockchain archive module 104 immediately copies/compresses/validates the previous blockchain 102A to the archive database 810 and creates the archive table 800 where the link to the archive 801 is already set to paint to the archive database 810 and the link to the previous blockchain 802 is set to null. The blockchain archive module 104 then deletes the previous blockchain 102A

The reverse process of FIG. 8 can also occur if an administrator wanted to unarchive one or more individual archived blockchains 811. For example, if a blockchain 102 was archived, but for some reason (e.g., there are a lot of accesses to get the archive data) the reverse process can be done to unarchive any previously archived blockchain(s) 811. Archived blockchains 811 may be unarchived in any order for any reason. The reverse archive process includes: 1) restoring the blockchain 102A from the archive 811. 2) setting the link to the previous blockchain 802 to point to the restored blockchain 102A, 3) setting the link to the archive 801 to be invalid, and 4) deleting the archived blockchain 811 from the archive database 810.

The archive process described above may be done individually by each node 101 in the distributed ledger 120. Each node 101 in the distributed ledger 120 may use the same or a different archive process. For example, one node 101 in the distributed ledger 120 may have different blockchains 102 in the consolidated blockchain 320 archived versus another node 101. In addition, the archive process may only archive the transaction data or specific blocks 201 in the blockchain 102 based on specific needs/implementation.

The archive process may occur based on a consensus of the nodes 101 in the distributed ledger. For example, a primary node 101 may propose an archive of a specific blockchain(s) 102 (other than the active blockchain 102). If there is a consensus, all of the nodes 101A-101N in the distributed ledger 120 archive the individual blockchain 102 in the same way. The proposal may include specifics on how the blockchain(s) 102 are to be archived. The proposal of how the blockchain(s) 102 are to be archived may be based on an administrated value or based on an event like those described above.

A key advantage to this archiving process is it provides flexibility. Any blockchain 102 (other than the active blockchain 102) can be archived/unarchived at any time and in any order. For example, if an administrator wanted to have the archive process start as soon as the third blockchain 102 is created (i.e., blockchain 102N in FIG. 4), the archive process would archive blockchain 102A when blockchain 102N (assuming three) is created. When a fourth blockchain 102 is created, blockchain 102B would then be archived and so on. If the administrator wanted to have newer blockchains 102 archived while older ones were not archived, this process supports that capability. Another key advantage is that part of the consolidated blockchain 320 can be archived while not having to uncompress each blockchain 102 in the consolidated blockchain 320 for verification of the hashes because the archived blockchain 811 is not part of the active blockchain (102B in this example).

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell Intel® Core® i5-3570K 22 nm Ivy Bridge, the AMD® FX™ family of processors, AMD® FX-4300, FX-6300, and FX-8350 32 nm Vishera, AMD® FX™ Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node 101 of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like, in these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:
identify a first event;
in response to identifying the first event:
complete an original blockchain; and
create a second blockchain,
wherein the second blockchain comprises a first consolidation genesis block and
wherein the first consolidation genesis block comprises a complete hash of the original blockchain and a first consolidation pointer that points to the original blockchain;
create a link to an archive of the original blockchain and a link to the original blockchain;
copy and validate the original blockchain;
set the link to the archive of the original blockchain to point to the copy of the original blockchain;
set the link to the original blockchain to indicate that the link to the original blockchain is not valid; and
delete the original blockchain.

2. The system of claim 1, wherein the complete hash of the original blockchain comprises at least one of: a first forward hash using a first hashing algorithm, a second forward hash using a second hashing algorithm, a first reverse hash using a third hashing algorithm, and a second reverse hash using a fourth hashing algorithm, wherein the first and second hashing algorithms are different and the third and fourth hashing algorithms are different.

3. The system of claim 1, wherein the original blockchain and the second blockchain comprise a forward hash and a reverse hash and wherein the first consolidation genesis block further comprises a complete reverse hash of the original blockchain.

4. The system of claim 1, wherein the microprocessor readable and executable instructions further cause the microprocessor to:
identify a second event; and
in response to identifying the second event, create a third blockchain,
wherein the third blockchain comprises a second consolidation genesis block that comprises a second consolidation pointer that points to the second blockchain and a complete hash of the second blockchain.

5. The system of claim 1, wherein a consolidated blockchain comprises the original blockchain and the second blockchain and further comprising:
validating an integrity of the consolidated blockchain by validating the complete hash of the original blockchain and a complete hash of the second blockchain.

6. The system of claim 1, wherein completing the original blockchain comprises adding an end block to the original blockchain and wherein one of the following is true:
the end block is a transaction block; and
the end block is not a transaction block.

7. The system of claim 1, wherein the microprocessor readable and executable instructions further cause the microprocessor to:
identify a second event; and
in response to identifying the second event, create a third blockchain,
wherein the third blockchain comprises a second consolidation genesis block, and
wherein the second consolidation genesis block comprises:
the first consolidation pointer that points to the original blockchain;
the complete hash of the original blockchain;
a second consolidation pointer that points to the second blockchain; and
a complete hash of the second blockchain.

8. The system of claim 7, wherein the second consolidation genesis block further comprises: first search information associated with the original blockchain and second search information associated with the second blockchain.

9. A method, comprising:
identifying, by a microprocessor, a first event;
in response to identifying the first event:
completing, by the microprocessor, an original blockchain; and
creating, by the microprocessor, a second blockchain,
wherein the second blockchain comprises a first consolidation genesis block and
wherein the first consolidation genesis block comprises a complete hash of the original blockchain and a first consolidation pointer that points to the original blockchain;
creating, by the microprocessor, a link to an archive of the original blockchain and a link to the original blockchain;
copying and validating, by the microprocessor, the original blockchain;
setting, by the microprocessor, the link to the archive of the original blockchain to point to the copy of the original blockchain;
setting, by the microprocessor, the link to the original blockchain to indicate that the link to the original blockchain is not valid; and
deleting, by the microprocessor, the original blockchain.

10. The method of claim 9, wherein the complete hash of the original blockchain comprises at least one of: a first forward hash using a first hashing algorithm, a second forward hash using a second hashing algorithm, a first reverse hash using a third hashing algorithm, and a second reverse hash using a fourth hashing algorithm, wherein the first and second hashing algorithms are different and the third and fourth hashing algorithms are different.

11. The method of claim 9, wherein the original blockchain and the second blockchain comprise a forward hash and a reverse hash and wherein the first consolidation genesis block further comprises a complete reverse hash of the original blockchain.

12. The method of claim 9, further comprising:
identifying a second event; and
in response to identifying the second event, creating a third blockchain,
wherein the third blockchain comprises a second consolidation genesis block that comprises a second consolidation pointer that points to the second blockchain and a complete hash of the second blockchain.

13. The method of claim 9, wherein a consolidated blockchain comprises the original blockchain and the second blockchain and further comprising:
validating an integrity of the consolidated blockchain by validating the complete hash of the original blockchain and a complete hash of the second blockchain.

14. The method of claim 9, wherein completing the original blockchain comprises adding an end block to the original blockchain and wherein one of the following is true:
the end block is a transaction block; and
the end block is not a transaction block.

15. The method of claim 9, further comprising:
identifying a second event; and
in response to identifying the second event, creating a third blockchain, wherein the third blockchain comprises a second consolidation genesis block, and
wherein the second consolidation genesis block comprises:
  the first consolidation pointer that points to the original blockchain;
  the complete hash of the original blockchain;
  a second consolidation pointer that points to the second blockchain; and
  a complete hash of the second blockchain.

16. The method of claim 15, wherein the second consolidation genesis block further comprises: first search information associated with the original blockchain and second search information associated with the second blockchain.

17. The system of claim 1, wherein the first event includes the original blockchain reaching a threshold number of blocks.

18. The system of claim 1, wherein the link to the archive of the original blockchain and the link to the original blockchain are provided in an archive table and wherein the original blockchain is copied and validated to an archive database.

19. The method of claim 9, wherein the first event includes the original blockchain reaching a threshold number of blocks.

20. The method of claim 9, wherein the link to the archive of the original blockchain and the link to the original blockchain are provided in an archive table and wherein the original blockchain is copied and validated to an archive database.

* * * * *